(12) United States Patent
Packer Ali et al.

(10) Patent No.: US 10,747,883 B2
(45) Date of Patent: Aug. 18, 2020

(54) COLLATED MULTI-IMAGE CHECK IN SYSTEM-ON-CHIPS

(71) Applicant: QUALCOMM Incorporated, San Diego, CA (US)

(72) Inventors: Dhamim Packer Ali, San Diego, CA (US); Dhaval Patel, San Diego, CA (US); Justin Yongjin Kim, San Diego, CA (US); Maria Miranda, Pune (IN); Cory David Feitelson, San Diego, CA (US); Eric Taseski, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 64 days.

(21) Appl. No.: 15/631,575

(22) Filed: Jun. 23, 2017

(65) Prior Publication Data

US 2018/0330095 A1 Nov. 15, 2018

(30) Foreign Application Priority Data

May 11, 2017 (IN) .............................. 201741016580

(51) Int. Cl.
*G06F 7/04* (2006.01)
*G06F 12/00* (2006.01)
*G06F 12/14* (2006.01)
*G06F 13/00* (2006.01)
*G11C 7/00* (2006.01)
*G06F 21/57* (2013.01)
*G06F 15/78* (2006.01)
(Continued)

(52) U.S. Cl.
CPC ............ *G06F 21/575* (2013.01); *G06F 15/76* (2013.01); *G06F 15/781* (2013.01); *G06F 21/44* (2013.01); *G06F 21/51* (2013.01); *G06F 21/572* (2013.01); *G06F 21/64* (2013.01); *H04L 9/0643* (2013.01); *H04L 9/0891* (2013.01); *H04L 9/3236* (2013.01); *H04L 9/3247* (2013.01); *G06F 8/65* (2013.01); *G06F 2221/033* (2013.01); *H04L 2209/12* (2013.01)

(58) Field of Classification Search
CPC ...... G06F 21/575; G06F 21/572; G06F 21/44; G06F 15/781; G06F 8/65; G06F 2221/033; H04L 9/3247; H04L 9/3236
USPC .......................................... 726/16
See application file for complete search history.

(56) References Cited

U.S. PATENT DOCUMENTS 8,784,195 B1 * 7/2014 Crowder, Jr. ......... H04L 9/3247
463/16
9,230,112 B1 1/2016 Peterson et al.
(Continued)

*Primary Examiner* — Trong H Nguyen
*Assistant Examiner* — Kevin Ayala
(74) *Attorney, Agent, or Firm* — Patterson + Sheridan, LLP

(57) ABSTRACT

Various additional and alternative aspects are described herein. In some aspects, the present disclosure provides a method of authenticating executable images in a system-on-chip (SoC), the method comprising: storing a plurality of executable images; storing, as separate from the plurality of executable images, a signed image of hashes comprising a plurality of hashes corresponding to the plurality of executable images and a first signature; authenticating the signed image of hashes based on the first signature; and using a first hash of the plurality of hashes to authenticate a first executable image of the plurality of executable images when the signed image of hashes passes authentication.

24 Claims, 6 Drawing Sheets

(51) Int. Cl.
*H04L 9/32* (2006.01)
*G06F 21/44* (2013.01)
*G06F 21/51* (2013.01)
*G06F 21/64* (2013.01)
*G06F 15/76* (2006.01)
*H04L 9/06* (2006.01)
*H04L 9/08* (2006.01)
*G06F 8/65* (2018.01)

(56) References Cited

U.S. PATENT DOCUMENTS

| | | |
|---|---|---|
| 2012/0166781 A1 | 6/2012 | De et al. |
| 2012/0210115 A1* | 8/2012 | Park ............... H04L 9/3242 |
| | | 713/2 |
| 2014/0365755 A1* | 12/2014 | Liu ............... G06F 21/572 |
| | | 713/2 |
| 2015/0261521 A1* | 9/2015 | Choi ............... H04L 9/3247 |
| | | 713/176 |
| 2016/0117166 A1 | 4/2016 | Djabarov et al. |
| 2017/0230185 A1* | 8/2017 | Varadhan ............... G06F 8/63 |
| 2017/0262656 A1 | 9/2017 | Salmon-Legagneur et al. |
| 2018/0075242 A1* | 3/2018 | Khatri ............... G06F 21/575 |

* cited by examiner

COLLATED MULTI-IMAGE CHECK IN SYSTEM-ON-CHIPS

CROSS-REFERENCE TO RELATED APPLICATIONS

This application claims priority to Indian Patent Application No. 201741016580, filed May 11, 2017. The content of the Indian Patent Application is hereby incorporated by reference in its entirety.

TECHNICAL FIELD

The teachings of the present disclosure relate generally to system-on-chip (SoC) integrated circuit design, and in certain aspects, to systems, apparatuses, and methods for collated multi-image checking, such as integrity and authentication checking, in SoCs, such as during boot and fail-safe image update.

INTRODUCTION

Computing devices are ubiquitous. Some computing devices are portable such as mobile phones, tablets, and laptop computers. As the functionality of such portable computing devices increases, the computing or processing power required and generally the data storage capacity to support such functionality also increases. In addition to the primary function of these devices, many include elements that support peripheral functions. For example, a cellular telephone may include the primary function of enabling and supporting cellular telephone calls and the peripheral functions of a still camera, a video camera, global positioning system (GPS) navigation, web browsing, sending and receiving emails, sending and receiving text messages, push-to-talk capabilities, etc. Many of these portable devices include a system-on-chip (SoC) to enable one or more primary and peripheral functions on the specific device.

A SoC generally includes multiple central processing unit (CPU) cores embedded in an integrated circuit or chip and coupled to a local bus. The CPU cores may further be arranged into one or more computing clusters. The SoC may further generally include hardware components and other processors.

The SoC, like larger computing devices such as desktop and server computers relies on a boot sequence or a boot code upon powering up. The boot sequence is the initial set of operations that the SoC performs when power is first applied to the SoC. The boot code enables a (e.g., bootstrapping) process that initializes the SoC. The boot code is typically stored in a read-only memory (ROM) for quick access, low complexity, spatial efficiency, low cost, and security reasons.

The boot sequence may utilize internal memory (e.g., on-chip memory that is on the same chip as the SoC, such as static random-access memory (SRAM)) and complex drivers to securely boot the SoC, as well as external memory (e.g., off-chip memory that is off the same chip as the SoC, including dynamic random access memory (DRAM), such as double data rate (DDR) synchronous DRAM (SDRAM), low power DDR (LPDDR), etc.) such as to save costs on the amount of internal memory used when the SoC has more functionality that requires more memory to boot. The external memory may be stacked with the SoC (e.g., application processor, modem chip, etc.), may be configured as a package on package design, may be completely external (e.g., not on the same package as the SoC), etc.

As part of the boot sequence, to boot each of or group of the hardware components and other processors of the SoC, there may be a chain of bootloaders and handoff secure executables (e.g., firmware executables, etc., also referred to as firmware images). In particular, each of the hardware components and other processors of the SoC may need to be booted (e.g., securely booted) using a firmware image for the particular hardware component. A chain loading method may be used to boot the various hardware components of the SoC by executing each of the firmware images. The greater the number of hardware components on the SoC, the greater the number of firmware images for the SoC that need to be executed. Accordingly, the boot time of the SoC (e.g., for secure and non-secure boot of components) is a function of the number of firmware images.

In addition, the boot of one or more of the hardware components may be secured, such as to meet requirements in certain applications for strong integrity check, authentication, or other security algorithms, to ensure that the firmware images have not been tampered with or corrupted, and originate from the intended party. Accordingly, the SoC may implement hashing algorithms (e.g., SHA256, SHA384, SHA512, etc.), encryption algorithms (e.g., AES variants), and/or digital signature algorithms (e.g., RSA 2K, RSA 4K, ECC P384, etc.) for checking the integrity and authentication of the firmware images. Further, even when secure boot is not enabled, hashing algorithms may still be used to enforce integrity check of firmware images, such as when booting from flash media or a flashless interface or interconnect (e.g., USB, PCIe, etc.). These various algorithms may be implemented in hardware or in software on the SoC, and due to computational complexity, may result in increased boot time of the SoC. The greater the number of firmware images, the more times such algorithms are run on the firmware images, thus increasing boot time.

In certain scenarios, a SoC may have certain boot time key performance indicator (KPI) metrics to meet. For example, certain components of the SoC may need to boot within certain time periods (e.g., ~500 ms) to meet the KPI (e.g., power on to first sign of life, power on to splash screen on display, power on to OS home screen, power on to when modem or WiFi or other subsystem is booted and ready to camp, power on to car rear camera up, secure boot counterparts, etc.). As the number of components on the SoC grows, meeting the KPI may become difficult. Accordingly, there is a need to reduce SoC boot time, including reducing a dependence of SoC boot time on the total number of firmware images in the SoC.

BRIEF SUMMARY OF SOME EXAMPLES

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

In some aspects, the present disclosure provides a method of authenticating executable images in a system-on-chip (SoC), the method comprising: storing a plurality of executable images; storing, as separate from the plurality of executable images, a signed image of hashes comprising a plurality of hashes corresponding to the plurality of executable images and a first signature; authenticating the signed image of hashes based on the first signature; and using a first hash of the plurality of hashes to authenticate a first executable image of the plurality of executable images when the signed image of hashes passes authentication.

In some aspects, the present disclosure provides a SoC. The SoC comprises an interface to a memory, the memory being configured to store: a plurality of executable images; and separate from the plurality of executable images, a signed image of hashes comprising a plurality of hashes corresponding to the plurality of executable images and a first signature. The SoC further comprises at least one processor configured to authenticate the signed image of hashes based on the first signature; and use a first hash of the plurality of hashes to authenticate a first executable image of the plurality of executable images when the signed image of hashes passes authentication.

In some aspects, the present disclosure provides a SoC. The SoC comprises means for storing a plurality of executable images. The SoC further comprises means for storing, as separate from the plurality of executable images, a signed image of hashes comprising a plurality of hashes corresponding to the plurality of executable images and a first signature. The SoC further comprises means for authenticating the signed image of hashes based on the first signature. The SoC further comprises means for using a first hash of the plurality of hashes to authenticate a first executable image of the plurality of executable images when the signed image of hashes passes authentication.

In some aspects, the present disclosure provides a non-transitory computer readable medium having instructions stored thereon that when executed by a system-on-chip (SoC) cause the SoC to perform a method of authenticating executable images in the SoC. The method comprises storing a plurality of executable images; storing, as separate from the plurality of executable images, a signed image of hashes comprising a plurality of hashes corresponding to the plurality of executable images and a first signature; authenticating the signed image of hashes based on the first signature; and using a first hash of the plurality of hashes to authenticate a first executable image of the plurality of executable images when the signed image of hashes passes authentication.

These and other aspects of the invention will become more fully understood upon a review of the detailed description, which follows. Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Although the teachings of this disclosure are illustrated in terms of integrated circuits (e.g., a SoC), the teachings are applicable in other areas. The teachings disclosed should not be construed to be limited to SoC designs or the illustrated embodiments. The illustrated embodiments are merely vehicles to describe and illustrate examples of the inventive teachings disclosed herein. Further, though certain collated multi-image checking techniques are described with respect to certain hardware components or processors, similar techniques may be used for collated multi-image checking of other components that are boot (e.g., by a SoC). Further, though certain collated multi-image checking techniques are described as being performed during boot, similar techniques may be used during other appropriate times to execute firmware images for hardware components, such as during fail-safe image update.

Figure 1:
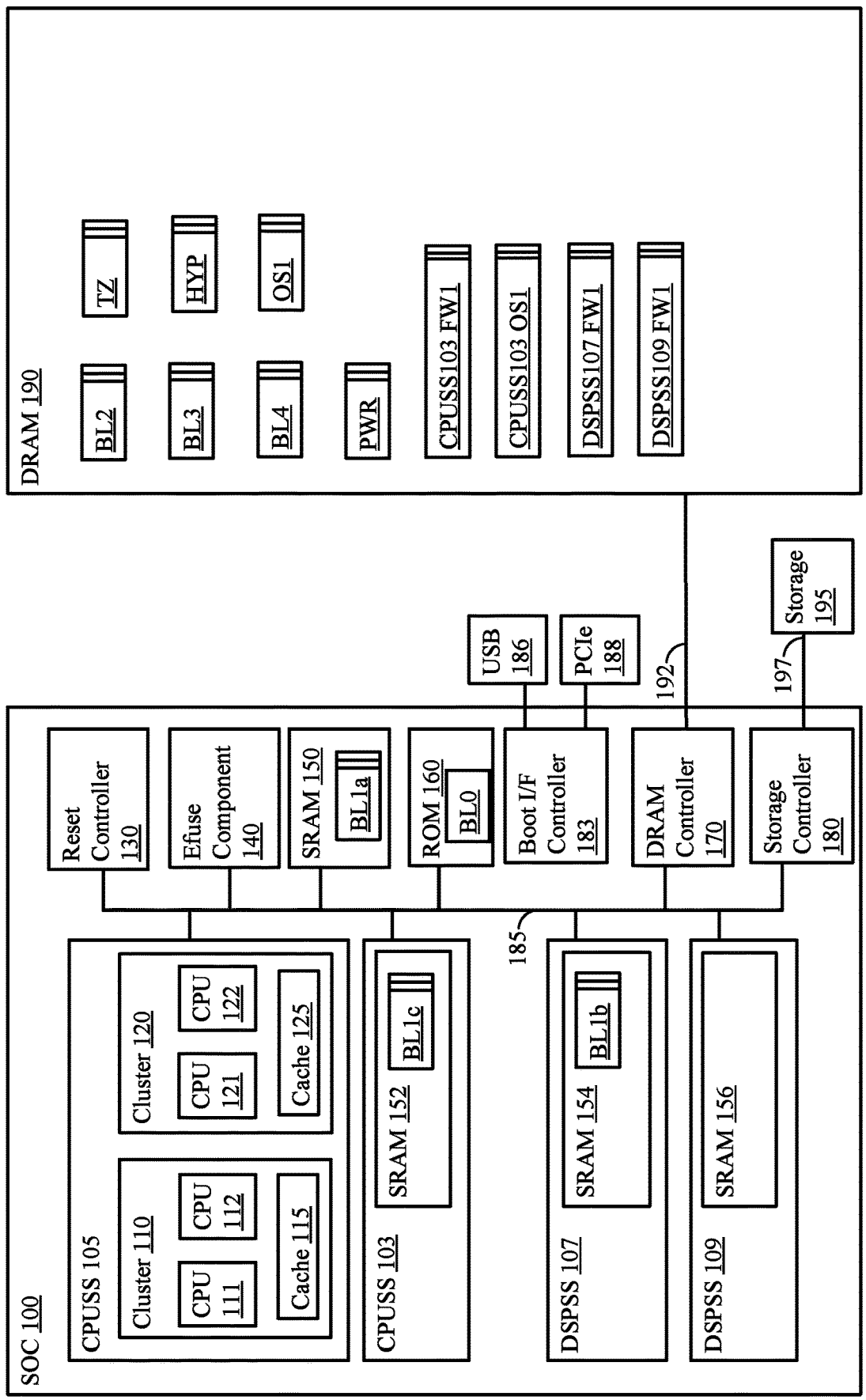
FIG. 1 is an illustration of an exemplary system-on-chip (SoC), in accordance with certain aspects of the present disclosure.

FIG. 1 is an illustration of an exemplary SoC 100, in accordance with certain aspects of the present disclosure. The SoC 100 may be interconnected to other chips by one or more chip-to-chip interfaces such as peripheral component interconnect express (PCIe), universal serial bus (USB), serial peripheral interface (SPI), etc. In certain aspects, one of the one or more chip-to-chip interfaces may be used for boot.

As shown, the SoC 100 includes a CPU sub-system (CPUSS) 105. The CPUSS 105 includes a plurality of CPU cores 111, 112, 121, and 122. Though CPUSS 105 is shown with a particular number of CPU cores, it should be noted that there may be additional or fewer cores in CPUSS 105. Further, CPU cores 111 and 112 are part of a cluster 110, and CPU cores 121 and 122 are part of a cluster 120. Again, though shown with a particular number of CPU clusters, CPUSS 105 may include additional or fewer clusters. Further, each cluster may include the same or a different number of CPU cores. The CPU cores 111, 112, 121, and 122 may be of the same type, or may be of different types (e.g., ARM design, non-ARM design, etc.). Further, the CPU cores of a given cluster (e.g., CPU cluster 110 or 120) may be of the same type, or may be of different types (e.g., in-cluster big.LITTLE design, cluster based big.LITTLE design, etc.).

Further, the CPUSS 105 may include CPU resources, such as one or more caches. As shown, each cluster 110 and 120 includes a cache 115 and 125, respectively. In certain aspects, the CPU cores of the clusters 110 and 120 may share the cache 115 and 125, respectively, for memory storage. It should be noted that the CPUSS 105 may include additional or different CPU resources than those shown. For example, in some aspects, one or more CPU cores may have its own associated cache, one or more clusters may have its own associated cache (e.g., shared by CPU cores of the cluster), and/or the CPUSS 105 may include one or more caches shared by one or more clusters and/or CPU cores. The SoC 100 further may include additional CPUSS 103, and one or more additional digital signal processor sub-systems (DSPSS) such as DSPSS 107 and DSPSS 109. In certain aspects, each of CPUSS 103, DSPSS 107, and DSPSS 109 may have its own SRAM 152, 154, and 156, respectively, for reading and writing data.

The SoC 100 further includes a reset controller 130, an efuse component 140, static random-access memory (SRAM) 150, a read only memory (ROM) 160, a dynamic RAM (DRAM) controller 170, and a storage controller 180, and boot interface (I/F) controller 183, which are all shown as internal (e.g., on-chip) components of the SoC 100. The internal components of the SoC 100 are coupled together by a bus 185. Further, the DRAM controller 170 is coupled to a DRAM 190 external (e.g., off-chip) from the SoC 100 by a bus 192. The DRAM 190 may be stacked with the SoC 100, may be configured as a package on package design, may be completely external (e.g., not on the same package as the SoC 100), etc. The storage controller 180 is coupled to a storage 195 (e.g., flash storage) external (e.g., off-chip) from the SoC 100 by a bus 197. The SRAM 150, DRAM 190, and storage 195 may provide storage capacity for the SoC 100.

In some aspects, the reset controller 130, during system boot, is configured to release a CPU core for the CPUSS 105 from reset. In some aspects, the CPU core released is then configured to execute code/data (e.g., boot code), such as ROM bootloader BL0 as shown, from the ROM 160 to boot the SoC 100 (e.g., to run a high level operating system (OS)). The ROM 160 (e.g., boot ROM) is an integrated circuit that includes the code or codes (e.g., boot code) that are executed by the CPUSS 105 during an initial power-on or upon a watchdog reset condition. In some aspects, the ROM is enabled in firmware. In some aspects, the CPUSS 105 boots (e.g., securely) from storage 195, by running firmware images stored in storage 195 for booting the SoC 100, including the various hardware components of the SoC 100. Further, though certain aspects are described with respect to the SoC 100 booting from storage 195, the SoC 100 may similarly boot (e.g., securely) from a transport layer instead of a storage (e.g., a flashless transport layer). For example, the CPUSS 105 may boot from the transport layer, by running firmware images received over the transport layer for booting the SoC 100. In particular, SoC 100 may utilize boot I/F controller 183 to communicate with another component (e.g., another SoC) over a chip-to-chip interface. For example, boot I/F controller 183 of SoC 100 may control a chip-to-chip interface (e.g., transport layer) of SoC 100 such as PCIe 188 or USB 186 to communicate with a chip-to-chip interface of another component. Accordingly, SoC 100 may communicate over a transport layer via boot I/F controller 183.

In certain aspects, the CPUSS 105 is configured to boot by running firmware images shown as loaded in DRAM 190, SRAM 150, SRAM 152, SRAM 154, and SRAM 156. For example, the CPUSS 105 executes ROM bootloader BL0 from ROM 160. The ROM bootloader BL0 causes the CPUSS 105 to execute bootloader BL1a in SRAM 150, which initializes DRAM controller 170 and DRAM 190, and/or Boot I/F controller 183. In certain aspects, ROM bootloader BL0 initializes Boot I/F controller 183 instead of bootloader BL1a, such as in a flashless boot configuration. Accordingly, the SoC 100 can access firmware images from DRAM 190 and/or over a chip-to-chip interface. BL1a may further boot the SoC 100 by controlling execution of additional firmware images, such as bootloaders BL2, BL3, and BL4, TZ (e.g., secure world firmware), HYP (e.g., hypervisor firmware), and OS1 (e.g., operating system) on the application processor (e.g., CPUSS 105) subsystem. Further, in certain aspects, other subsystem firmware images booted during the boot process include PWR (e.g., power firmware), CPUSS 103 FW1 (e.g., CPUSS 103 firmware), CPUSS 103 OS1 (e.g., CPUSS 103 operating system), DSPSS 107 FW1 (e.g., DSPSS 107 firmware), and DSPSS 109 FW1 (e.g., DSPSS 109 firmware). In certain aspects, certain early firmware images are booted by BL1a, and the remaining firmware images are booted by an operating system such as OS1.

In certain aspects, each of the firmware images described (e.g., except for ROM bootloader BL0) that needs an integrity check and secure boot is further padded or bundled with data (e.g., bits) corresponding to one or more hashes of the firmware image (e.g., a hash for each segment of multiple segments of the firmware image). Further, each firmware image with data corresponding to one or more hashes includes a signature and/or certificate (for ease of explanation, certain aspects are described as including only a signature, though such aspects may include a signature and/or certificate instead of just a signature) of the one or more hashes corresponding to the firmware image and the firmware image, which may be used for authentication of the sender, integrity check, etc. Accordingly, for each of the firmware images that needs an integrity check and secure boot, separate hashes and signatures are calculated and included (e.g., stored as part of, appended to, padded with, etc.) with the firmware image. The hashes and signatures are shown as boxes appended to the firmware images in FIG. 1. The use of a separate signature for each of the firmware images (e.g., such as where there are multiple firmware images) for performing an integrity check, authentication, etc. for each of the firmware images may be computationally expensive and increase boot time.

In certain aspects, all of the firmware images for booting the SoC 100 may be merged into a single firmware image to lower the boot time. The single firmware image may then be hashed and a single signature calculated for the hashes.

Accordingly, only a single signature is used for performing an integrity check, authentication, etc. However, with a single firmware image, if any code is changed for any one of the firmware images discussed, the entire single firmware image may need to be repackaged signed and authenticated. This can lead to less flexibility during development, support, update, etc. of the SoC 100 as different firmware images cannot be independently updated.

In certain aspects, a partial secure boot solution may be used for booting the SoC 100 to lower the boot time. In particular, not all of the firmware images may be secured and authenticated. However, such a solution means the boot procedure is less secure, which may not be desirable or feasible for certain applications.

In certain aspects, the boot of different subsystems may be parallelized, such as by including separate hardware (e.g., ROM, hardware for securing and authenticating images such as cryptography engines, RSA/ECC engines, etc.) to lower the boot time. However, this increases costs of the SoC 100 such as bill of materials (BOM), silicon area, keeping the subsystems in synchronization, etc.

Accordingly, to overcome the issues of the various approaches for booting a SoC, provided herein are techniques to calculate hashes for separate firmware images, form a single image of the hashes for the separate images, and then generate one or more hashes for the single image of the hashes, and a signature for the one or more hashes and the single image of the hashes. It should be noted that in some aspects, one or more hashes of the single image may not be generated, and instead only a signature of the single image of the hashes is generated. The single image of the hashes, including the corresponding one or more hashes and signature, may be stored separately from the separate firmware images. Accordingly, only a single signature can be used to perform an integrity check, authentication, etc. of the separate firmware images. Therefore, the signature cost of the separate firmware images is not dependent on the number of firmware images, thereby decreasing boot time. Further, each separate firmware image can still be updated individually, and also secured. In certain aspects, the techniques for separate firmware images may also be used with the other techniques described herein.

Figure 1A:
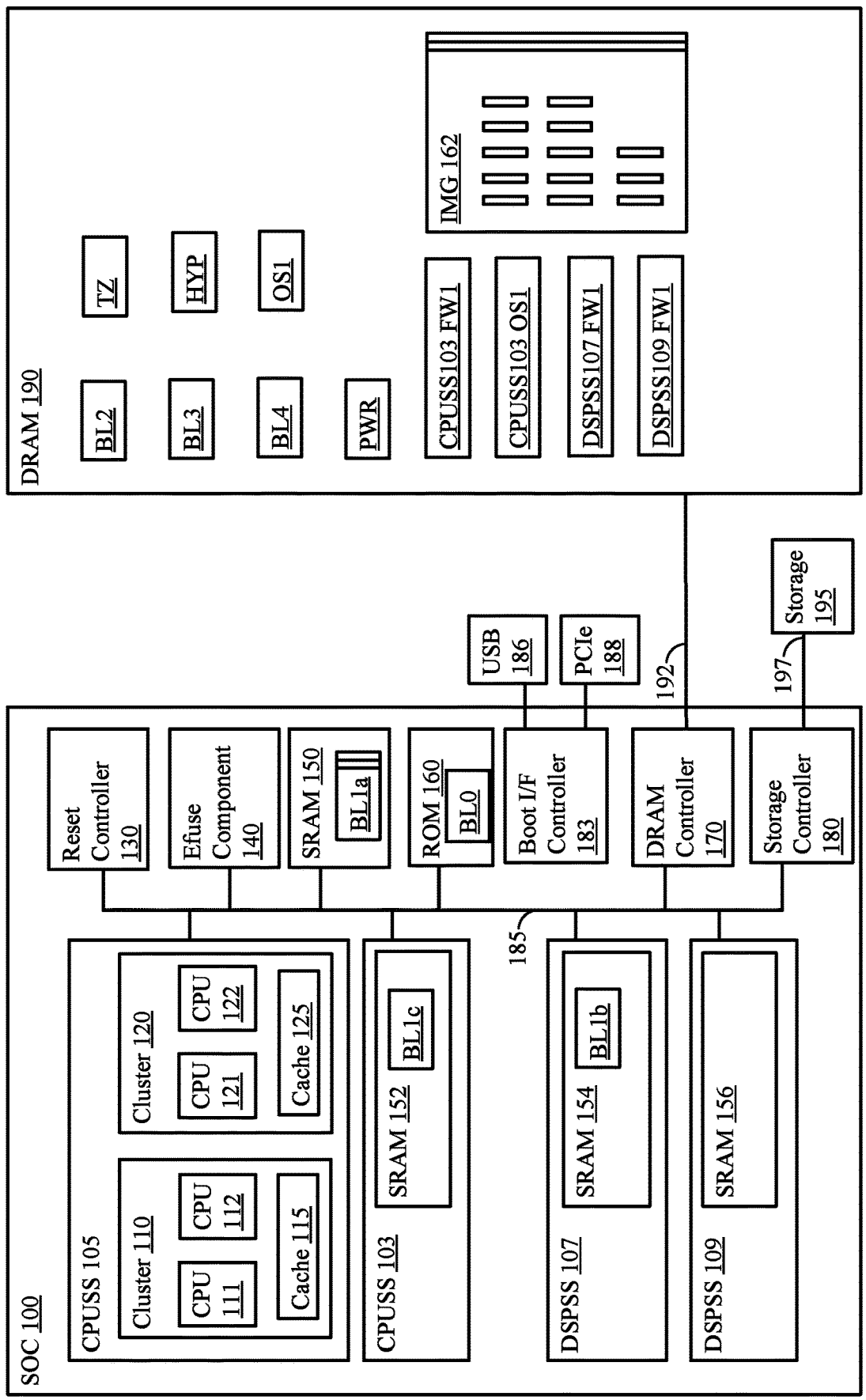
FIG. 1A is an illustration of an exemplary system-on-chip (SoC), in accordance with certain aspects of the present disclosure.

FIG. 1A is an illustration of an exemplary SoC 100, in accordance with certain aspects of the present disclosure. In particular, FIG. 1A illustrates the same SoC 100 as FIG. 1, including the same separate firmware images (e.g., BL0, BL1a, BL1b, BL1c, BL2, BL3, and BL4, TZ, HYP, OS1, PWR, CPUSS 103 FW1, CPUSS 103 OS1, DSPSS 107 FW1, DSPSS 109 FW1, etc.). However, unlike as shown in FIG. 1, a plurality of the separate firmware images do not include separate signatures for the hashes associated with each of the separate firmware images. For example, a plurality of the separate firmware images do not have corresponding hashes and signatures appended to each of the separate firmware images. Instead, as shown in FIG. 1A, a separate image IMG 162 including the hashes for each of the separate firmware images is shown stored in DRAM 190. In some aspects, the plurality of the separate firmware images do have corresponding hashes and signatures appended to each of the separate firmware images, but they are not used for authentication and integrity check, unless there is a failure with respect to authentication of IMG 162, and alternate procedures using individual hashes and signatures appended to each of the separate firmware images are used as discussed further herein. In particular, hashes for each of the separate firmware images are still generated. However, the hashes may not be appended to the corresponding firmware images. Instead, the hashes are included in the IMG 162. Further, the IMG 162 includes one or more hashes (e.g., one or more overall hashes) of the hashes for each of the separate firmware images, and a signature of the one or more overall hashes and the single image of hashes. Accordingly, instead of each of the individual firmware images being signed and individual signatures being used for authentication, integrity check, etc. with security algorithms, only the IMG 162 is signed and the signature used for authentication, integrity check, etc., thereby reducing the computation costs for signing and authenticating firmware images in SoC 100.

For example, at boot of the SoC 100, the SoC 100 is booted as normal from ROM 160 using ROM bootloader BL0. The ROM bootloader BL0 causes the CPUSS 105 to execute bootloader BL1a in SRAM 150, which initializes DRAM controller 170 and DRAM 190, and/or Boot I/F controller 183. In certain aspects, ROM bootloader BL0 initializes Boot I/F controller 183 instead of bootloader BL1a, such as in a flashless boot configuration. In certain aspects, the processing of ROM bootloader BL0 and bootloader BL1a may be separate from the other firmware images, as DRAM controller 170 and DRAM 190, and/or Boot I/F controller 183 may not be initialized and therefore IMG 162 may not be accessible. For the remaining firmware images, the IMG 162 is authenticated based on the signature associated with the IMG 162 and the one or more overall hashes for the IMG 162. The individual hashes in the IMG 162 are then used to perform integrity checks and secure boot checks of the individual firmware images. It should be noted that though all the individual firmware images of the SoC 100 are shown as having hashes included in the IMG 162 instead of appended to the corresponding individual firmware images, in some aspects, one or more of the individual firmware images may have its hash appended and separately signed, and not included in IMG 162. Further, in some aspects, there may be multiple IMG 162 where the hashes of different firmware images are included in different IMG 162. For example, hashes for firmware images from different sources (e.g., OEM, vendors, etc.), for example having different root certificates and signatures, may be included in different IMG 162. In some aspects, the multiple IMG 162 may be combined into a single image.

Figure 2:
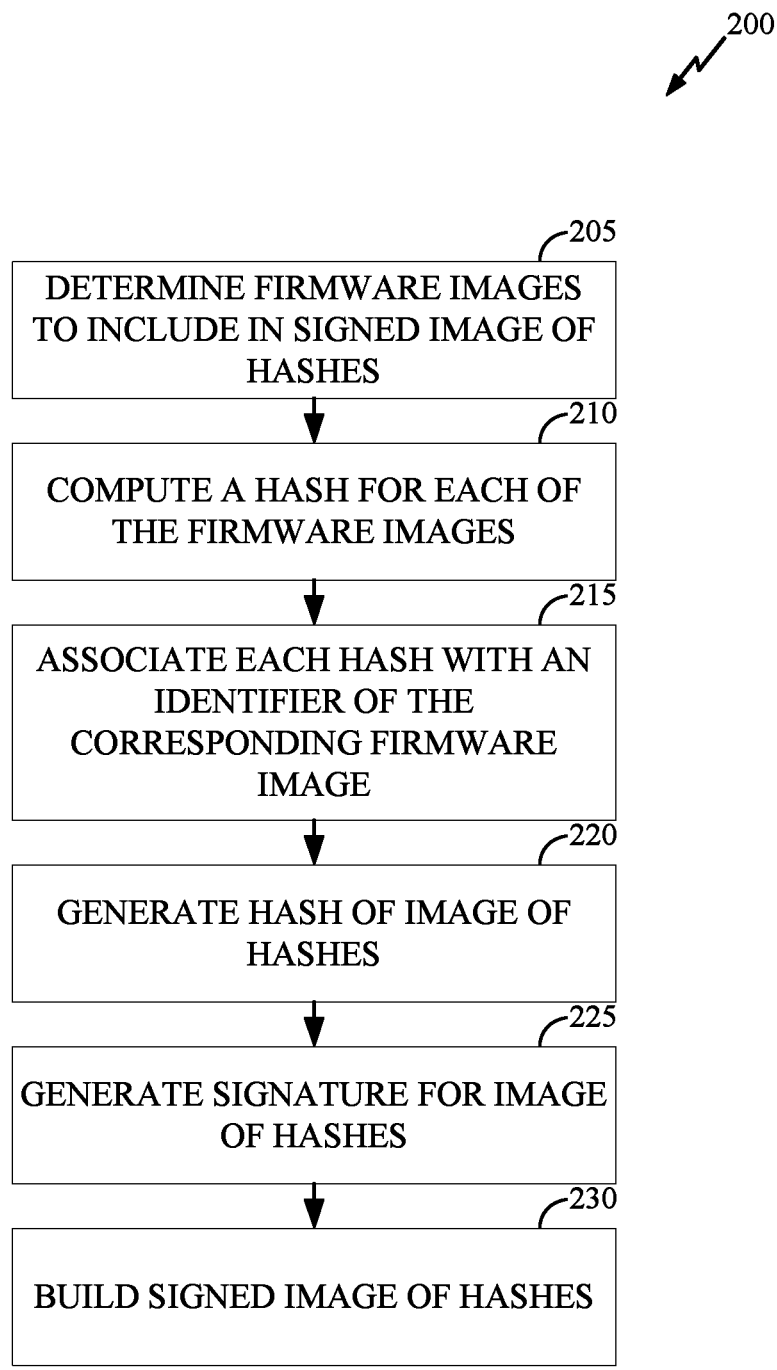
FIG. 2 illustrates exemplary operations for building a signed image of hashes, in accordance with certain aspects of the present disclosure.

FIG. 2 illustrates exemplary operations 200 for building a signed image of hashes, such as IMG 162. In certain aspects, operations 200 may be performed by a computing device other than a SoC, or by a SoC such as SoC 100.

At 205, the computing device determines all the firmware images for the SoC 100 to include in the signed image of hashes. Each of the firmware images may be associated with an identifier (e.g., pointer, meta data, etc.) that (e.g., uniquely) identifies the firmware image among all the firmware images for the SoC 100. At 210, the computing device computes a hash (e.g., based on the firmware image, based on meta-data of the firmware image, etc.) for each of the firmware images to be included in the signed image of hashes.

At 215, the computing device associates each hash (e.g., in a table) with the identifier of the corresponding firmware image for which the hash was computed, and generates an image of the hashes. At 220, the computing device generates one or more hashes of the image of the hashes, and appends the one or more hashes to the image of the hashes.

At 225, the computing device generates a signature for the image of the hashes (e.g., including the appended one or more hashes). At 230, the computing device appends the signature to the image of the hashes to build the signed image of hashes. As discussed, the computing device may generate multiple such signed images of hashes, and further may combine the multiple signed images of hashes into a single multi-signed image of hashes.

Figure 3:
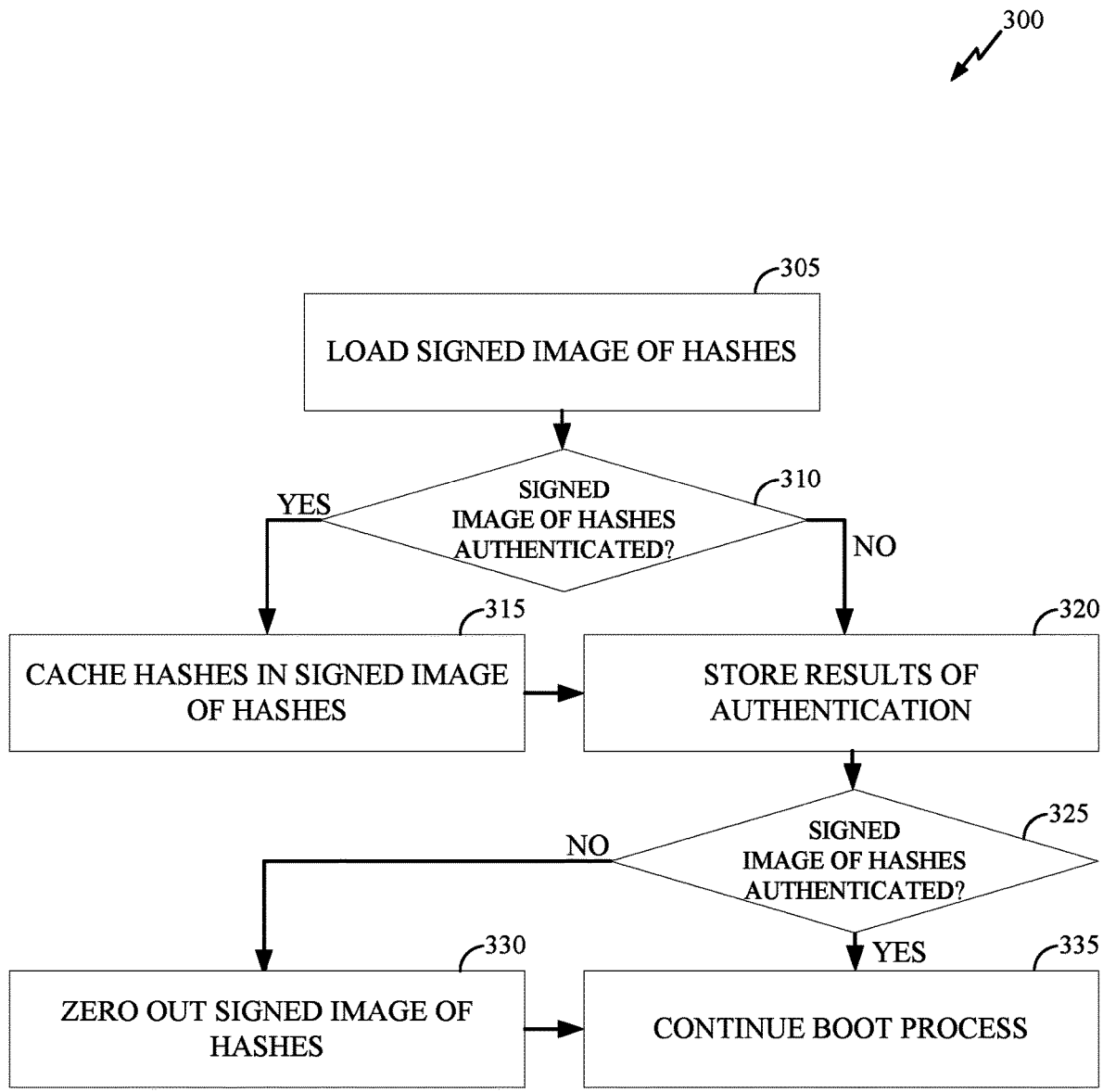
FIG. 3 illustrates exemplary operations for performing an integrity check and authentication of firmware images at a SoC using a signed image of hashes, in accordance with certain aspects of the present disclosure.

FIG. 3 illustrates exemplary operations 300 for performing an integrity check and authentication of firmware images at a SoC using a signed image of hashes. In certain aspects, operations 300 may be performed by a SoC, such as SoC 100.

At 305, a bootloader of the SoC 100 (e.g., BL1a) loads the signed image of hashes (e.g., IMG 162) for processing by the SoC 100 (e.g., CPUSS 105). At 310, the SoC 100, in a secure mode of operation, determines if an authentication of the IMG 162 passes based on the signature included in the IMG 162. For example, the SoC 100 may utilize an authentication algorithm (e.g., based on a root certificate at the SoC 100) to determine if the IMG 162 is authenticated. If at 310, the authentication passes, at 315, the hashes of individual firmware images in the IMG 162 are cached in a secure memory (e.g., SRAM, DRAM, etc.) at the SoC 100, and operations 300 continue to 320. If at 310, the authentication does not pass, operations 300 continue to 320.

Continuing at 320, the results of the authentication are stored in return variables at the SoC 100, and the SoC 100 returns to a non-secure mode of operation. At 325, the SoC 100, based on the value of the return variables, determines if the IMG 162 is authenticated. If at 325, the SoC 100 determines the IMG 162 is not authenticated, the operations 300 continue to 330. If at 325, the SoC 100 determines the IMG 162 is authenticated, the operations continue to 335.

At 330, the loaded IMG 162 is zeroed out. In certain aspects, when the IMG 162 is zeroed out, the SoC 100 falls back to using individual hashes and/or signatures appended to each of the separate firmware images for performing integrity check and authentication of firmware images. Continuing at 335, the boot process continues for each of the firmware images of the SoC 100, such as described with respect to FIG. 4, starting at 405.

Figure 4:
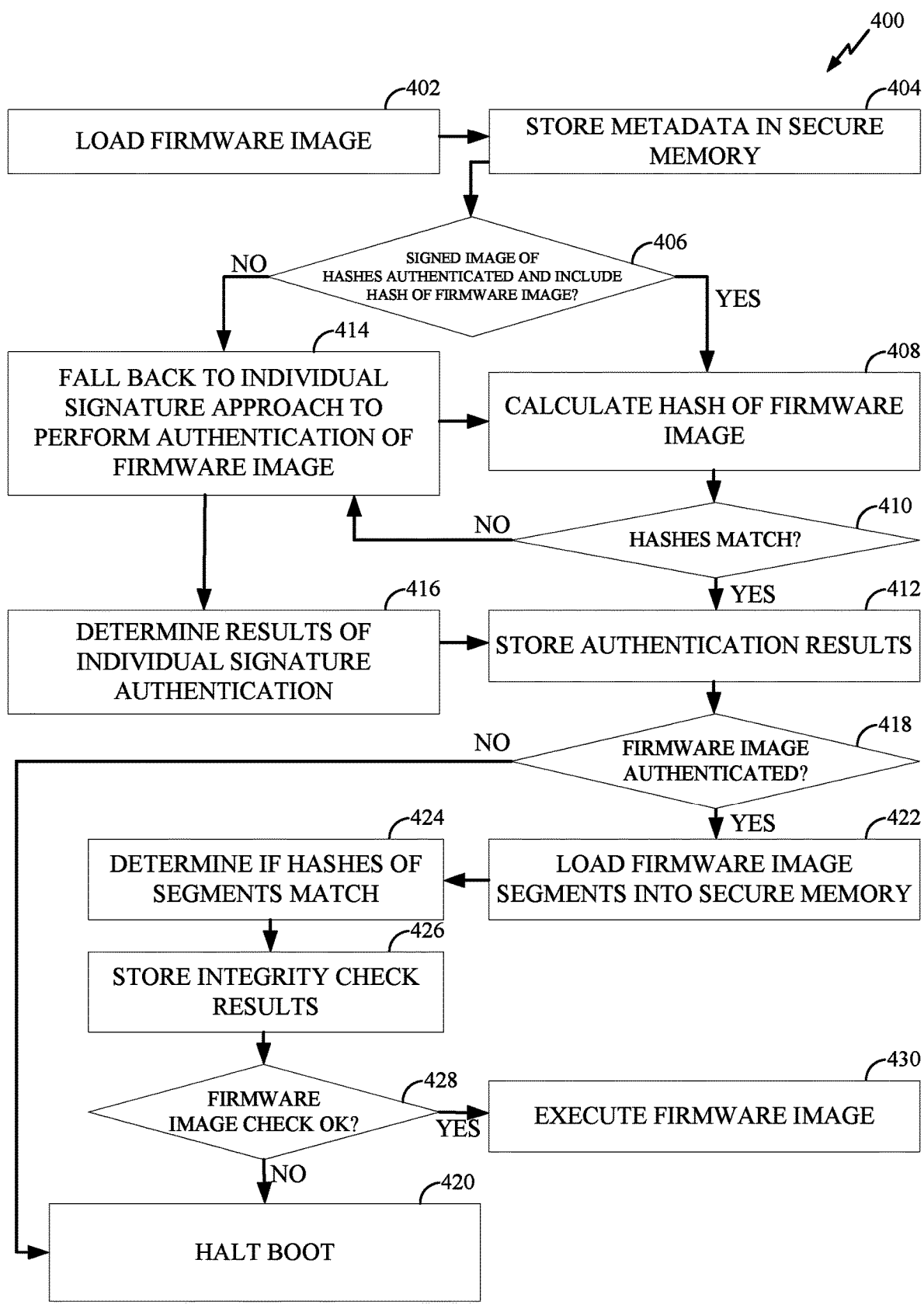
FIG. 4 illustrates exemplary operations for performing an integrity check and authentication of firmware images at a SoC using a signed image of hashes, in accordance with certain aspects of the present disclosure.

FIG. 4 illustrates exemplary operations 400 for performing an integrity check and authentication of firmware images at a SoC using a signed image of hashes. In certain aspects, operations 400 may be performed by a SoC, such as SoC 100. In certain aspects, operations 400 may be performed for each of the firmware images of the SoC 100.

At 402, a bootloader of the SoC 100 (e.g., BL1a) loads metadata (e.g., hash table, etc.) of a firmware image. At 404, in a secure mode of operation, the SoC 100 (e.g., CPUSS 105) stores the meta data of the firmware image in secure memory (e.g., SRAM, DRAM, etc.). At 406, the SoC 100 determines if the signed image of hashes was authenticated (e.g., is cached in secure memory and not zeroed out) and further determines if the hash for the firmware image is included in the signed image of hashes (e.g., based on matching an identifier of the firmware image).

If at 406, the SoC 100 determines the signed image of hashes was authenticated, and the hash for the firmware image is included in the signed image of hashes, operations 400 continue to 408. At 408, the SoC 100 calculates a hash of the firmware image (e.g., of meta data of the firmware image). For example, the SoC 100 may calculate a hash of the firmware image using the same algorithm as used with respect to calculating a hash as described with respect to FIG. 2 at 210. At 410, the SoC 100 determines if the hash calculated by SoC 100 matches the hash for the firmware image included in the signed image of hashes. If the SoC 100 determines at 410 the hashes match, the authentication passes, and the operations 400 continue to 412 where the results of the authentication passing are stored in return variables. If at 410, the SoC 100 determines the hashes do not match, operations 400 continue to 414.

If at 406, the SoC 100 determines the signed image of hashes was not authenticated, or the hash for the firmware image is not included in the signed image of hashes, operations 400 continue to 414. At 414, the SoC 100 falls back to using a per image authentication strategy such as using an individual signature approach for performing integrity check and authentication of the firmware image. For example, the SoC 100 uses an individual signature associated with the firmware image to authenticate the firmware image and uses a hash appended to the firmware image to perform an integrity check of the firmware image. At 416, it is determined if the individual signature approach for performing integrity check and authentication of the firmware image passes or not. If at 416, the integrity check and authentication of the firmware image passes, the authentication passes, and the operations 400 continue to 412 where the results of the authentication passing are stored in return variable. If at 416, the integrity check and authentication of the firmware image does not pass, the authentication does not pass, and the operations 400 continue to 412 where the results of the authentication not passing are stored in return variable.

Continuing at 418, and returning to a non-secure mode of operation, the SoC 100, based on the value of the return variables, determines if the firmware image is authenticated. If at 418, the SoC 100 determines the firmware image is not authenticated, the operations 400 continue to 420, where an error handler is initiated and the boot process is halted. If at 418, the SoC 100 determines the firmware image is authenticated, the operations continue to 422.

At 422, the bootloader of the SoC 100 loads the firmware image (e.g., segments of the firmware image) into secure memory, and again operates in a secure mode. At 424, the SoC 100 determines if the hash for each segment of the firmware image as computed by the SoC 100 matches the corresponding hash for the firmware image (e.g., corresponding to hashes appended to the firmware image, or part of IMG 162). At 426, the SoC 100 stores in return variables whether the hash of each segments matches (passes an integrity check), or whether the hash of any segment does not match (does not pass an integrity check).

Continuing at 428, and returning to a non-secure mode of operation, the SoC 100, based on the value of the return variables, determines if each segment of the firmware image passes an integrity check. If at 428, the integrity check of each segment passes, the operations 400 continue to 430, where the firmware image is executed and boot continues. If at 428, the integrity check of any segment does not pass, the operations 400 continue to 420, where an error handler is initiated and the boot process is halted.

In certain aspects, based on the operations 400 and 500, updates (e.g., over the air updates) to firmware images are not impacted negatively. For example, if a firmware image is updated, the signed image of hashes also is updated based on the new firmware image having a new hash. During an over the air update, it may be possible that only one of the firmware image or the signed image of hashes is updated (e.g., due to an error). However, operations 400 and 500 still allow the SoC 100 to boot. For example, if the signed image of hashes is not updated and the firmware image is updated, the fall back to secure boot using individual signatures and/or hashes to authenticate the individually signed firmware images allows the SoC 100 to boot each of the individually signed firmware images, even though the signed image of hashes may not pass the integrity check. Further, if the signed image of hashes is updated and a firmware image is not updated, the firmware image not updated can use the fall back to secure boot using individual signatures and/or hashes to authenticate the individually signed firmware image to allows the SoC 100 to boot the firmware image. The remaining firmware images can be authenticated using the signed image of hashes. If either condition occurs, an update agent on the SoC 100 can request the missing update data be retransferred.

Figure 5:
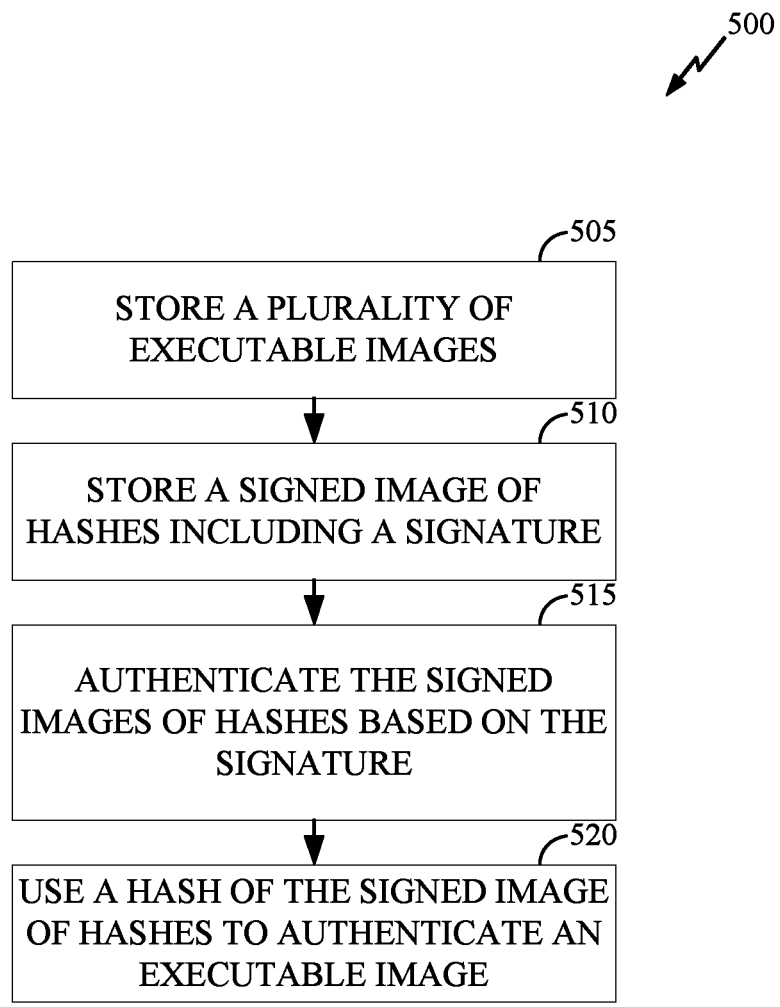
FIG. 5 illustrates exemplary operations for performing an integrity check and authentication of firmware images at a SoC using a signed image of hashes, in accordance with certain aspects of the present disclosure.

FIG. 5 illustrates exemplary operations 500 for performing an integrity check and authentication of firmware images at a SoC using a signed image of hashes. In certain aspects, operations 500 are performed by an SoC, such as SoC 100.

At 505, the SoC stores (e.g., in DRAM, SRAM, on-chip, off-chip, etc.) a plurality of executable images (e.g., firmware images). At 510, the SoC stores (e.g., in DRAM, SRAM, on-chip, off-chip, etc.) as separate from the plurality of executable images, a signed image of hashes comprising a plurality of hashes corresponding to the plurality of executable images and a first signature.

At 515, the SoC authenticates the signed image of hashes based on the signature. At 520, the SoC uses a first hash of the plurality of hashes to authenticate a first executable image of the plurality of executable images when the signed image of hashes passes authentication.

In some configurations, the term(s) 'communicate,' 'communicating,' and/or 'communication' may refer to 'receive,' 'receiving,' 'reception,' and/or other related or suitable aspects without necessarily deviating from the scope of the present disclosure. In some configurations, the term(s) 'communicate,' 'communicating,' 'communication,' may refer to 'transmit,' 'transmitting,' 'transmission,' and/or other related or suitable aspects without necessarily deviating from the scope of the present disclosure.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits.

One or more of the components, steps, features and/or functions illustrated herein may be rearranged and/or combined into a single component, step, feature or function or embodied in several components, steps, or functions. Additional elements, components, steps, and/or functions may also be added without departing from novel features disclosed herein. The apparatus, devices, and/or components illustrated herein may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

These apparatus and methods described in the detailed description and illustrated in the accompanying drawings by various blocks, modules, components, circuits, steps, processes, algorithms, etc. (collectively referred to as "elements"). These elements may be implemented using hardware, software, or combinations thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, firmware, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, or combinations thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, PCM (phase change memory), flash memory, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

What is claimed is:

1. A method of authenticating executable images in a system-on-chip (SoC), the method comprising:
   storing a plurality of executable images;
   storing, as separate from the plurality of executable images, a signed image of hashes comprising: i) an image of hashes comprising a plurality of hashes corresponding to the plurality of executable images; and ii) a first signature of the image of hashes;
   authenticating the signed image of hashes based on the first signature;
   using a first hash of the plurality of hashes to authenticate a first executable image of the plurality of executable images when the signed image of hashes passes the authentication based on the first signature; and
   using a second hash appended to the first executable image to authenticate the first executable image when the signed image of hashes does not pass the authentication based on the first signature.

2. The method of claim 1, further comprising caching the plurality of hashes in secure memory when the signed image of hashes passes the authentication based on the first signature.

3. The method of claim 1, further comprising using a third hash of the plurality of hashes to authenticate a second executable image of the plurality of executable images when the signed image of hashes passes the authentication based on the first signature.

4. The method of claim 1, further comprising:
   updating a second executable image of the plurality of executable images, while not updating the signed image of hashes;
   determining the signed image of hashes does not pass the authentication based on the first signature; and
   using hashes appended to each of the plurality of executable images to authenticate the plurality of executable images.

5. The method of claim 1, further comprising:
   updating the signed image of hashes based on an updated second executable image of the plurality of executable images, while not updating the second executable image;
   computing a hash of the second executable image;
   determining a third hash of the plurality of hashes corresponding to the second executable image does not match the computed hash; and
   using a hash appended to the second executable image to authenticate the second executable image.

6. The method of claim 1, further comprising storing a second signed image of hashes comprising: i) a second image of hashes comprising a second plurality of hashes corresponding to a second plurality of executable images; and ii) a second signature of the second image of hashes, wherein the second signature is generated with a different root certificate than the first signature; and authenticating the second signed image of hashes based on the second signature.

7. A system-on-chip (SoC) comprising:
   an interface to a memory, the memory being configured to store:
      a plurality of executable images; and
      separate from the plurality of executable images, a signed image of hashes comprising: i) an image of hashes comprising a plurality of hashes corresponding to the plurality of executable images; and ii) a first signature of the image of hashes; and
   at least one hardware processor configured to:
      authenticate the signed image of hashes based on the first signature;
      use a first hash of the plurality of hashes to authenticate a first executable image of the plurality of executable images when the signed image of hashes passes the authentication based on the first signature; and
      use a second hash appended to the first executable image to authenticate the first executable image when the signed image of hashes does not pass the authentication based on the first signature.

8. The SoC of claim 7, further comprising a secure memory, and wherein the at least one processor is further configured to cache the plurality of hashes in the secure memory when the signed image of hashes passes the authentication based on the first signature.

9. The SoC of claim 7, wherein the at least one processor is further configured to use a third hash of the plurality of hashes to authenticate a second executable image of the plurality of executable images when the signed image of hashes passes the authentication based on the first signature.

10. The SoC of claim 7, wherein the at least one processor is further configured to:
    update a second executable image of the plurality of executable images, while not updating the signed image of hashes;
    determine the signed image of hashes does not pass the authentication based on the first signature; and
    use hashes appended to each of the plurality of executable images to authenticate the plurality of executable images.

11. The SoC of claim 7, wherein the at least one processor is further configured to:
    update the signed image of hashes based on an updated second executable image of the plurality of executable images, while not updating the second executable image;
    compute a hash of the second executable image;
    determine a third hash of the plurality of hashes corresponding to the second executable image does not match the computed hash; and
    use a hash appended to the second executable image to authenticate the second executable image.

12. The SoC of claim 7, wherein the memory is further configured to store a second signed image of hashes comprising: i) a second image of hashes comprising a second plurality of hashes corresponding to a second plurality of executable images; and ii) a second signature of the second image of hashes, wherein the second signature is generated with a different root certificate than the first signature, wherein the at least one processor is further configured to authenticate the second signed image of hashes based on the second signature.

13. A system-on-chip (SoC) comprising:
means for storing a plurality of executable images;
means for storing, as separate from the plurality of executable images, a signed image of hashes comprising: i) an image of hashes comprising a plurality of hashes corresponding to the plurality of executable images; and ii) a first signature of the image of hashes;
means for authenticating the signed image of hashes based on the first signature;
means for using a first hash of the plurality of hashes to authenticate a first executable image of the plurality of executable images when the signed image of hashes passes the authentication based on the first signature; and
means for using a second hash appended to the first executable image to authenticate the first executable image when the signed image of hashes does not pass the authentication based on the first signature.

14. The SoC of claim 13, further comprising means for caching the plurality of hashes in secure memory when the signed image of hashes passes the authentication based on the first signature.

15. The SoC of claim 13, further comprising means for using a third hash of the plurality of hashes to authenticate a second executable image of the plurality of executable images when the signed image of hashes passes the authentication based on the first signature.

16. The SoC of claim 13, further comprising:
means for updating a second executable image of the plurality of executable images, while not updating the signed image of hashes;
means for determining the signed image of hashes does not pass the authentication based on the first signature; and
means for using hashes appended to each of the plurality of executable images to authenticate the plurality of executable images.

17. The SoC of claim 13, further comprising:
means for updating the signed image of hashes based on an updated second executable image of the plurality of executable images, while not updating the second executable image;
means for computing a hash of the second executable image;
means for determining a third hash of the plurality of hashes corresponding to the second executable image does not match the computed hash; and
means for using a hash appended to the second executable image to authenticate the second executable image.

18. The SoC of claim 13, further comprising means for storing a second signed image of hashes comprising: i) a second image of hashes comprising a second plurality of hashes corresponding to a second plurality of executable images; and ii) a second signature of the second image of hashes, wherein the second signature is generated with a different root certificate than the first signature; and means for authenticating the second signed image of hashes based on the second signature.

19. A non-transitory computer readable medium having instructions stored thereon that when executed by a system-on-chip (SoC) cause the SoC to perform a method of authenticating executable images in the SoC, the method comprising:
storing a plurality of executable images;
storing, as separate from the plurality of executable images, a signed image of hashes comprising: i) an image of hashes comprising a plurality of hashes corresponding to the plurality of executable images; and ii) a first signature of the image of hashes;
authenticating the signed image of hashes based on the first signature;
using a first hash of the plurality of hashes to authenticate a first executable image of the plurality of executable images when the signed image of hashes passes the authentication based on the first signature; and
using a second hash appended to the first executable image to authenticate the first executable image when the signed image of hashes does not pass the authentication based on the first signature.

20. The non-transitory computer readable medium of claim 19, wherein the method further comprises caching the plurality of hashes in secure memory when the signed image of hashes passes the authentication based on the first signature.

21. The non-transitory computer readable medium of claim 19, wherein the method further comprises using a third hash of the plurality of hashes to authenticate a second executable image of the plurality of executable images when the signed image of hashes passes the authentication based on the first signature.

22. The non-transitory computer readable medium of claim 19, wherein the method further comprises:
updating a second executable image of the plurality of executable images, while not updating the signed image of hashes;
determining the signed image of hashes does not pass the authentication based on the first signature; and
using hashes appended to each of the plurality of executable images to authenticate the plurality of executable images.

23. The non-transitory computer readable medium of claim 19, wherein the method further comprises:
updating the signed image of hashes based on an updated second executable image of the plurality of executable images, while not updating the second executable image;
computing a hash of the second executable image;
determining a third hash of the plurality of hashes corresponding to the second executable image does not match the computed hash; and
using a hash appended to the second executable image to authenticate the second executable image.

24. The non-transitory computer readable medium of claim 19, wherein the method further comprises storing a second signed image of hashes comprising: i) a second image of hashes comprising a second plurality of hashes corresponding to a second plurality of executable images; and ii) a second signature of the second image of hashes, wherein the second signature is generated with a different root certificate than the first signature; and authenticating the second signed image of hashes based on the second signature.

* * * * *